United States Patent [19]

Fuimefreddo et al.

[11] Patent Number: 5,013,883

[45] Date of Patent: May 7, 1991

[54] PLASMA SPRAY DEVICE WITH EXTERNAL POWDER FEED

[75] Inventors: Anthony J. Fuimefreddo, Bellmore; John E. Nerz, Seldon; Martin E. Hacker, Lake Ronkonkoma; Gunther Hain, Dix Hills, all of N.Y.

[73] Assignee: The Perkin-Elmer Corporation, Norwalk, Conn.

[21] Appl. No.: 526,091

[22] Filed: May 18, 1990

[51] Int. Cl.$^5$ .................................... B23K 9/00

[52] U.S. Cl. ....................... 219/121.47; 219/121.48; 219/121.5; 219/121.51; 219/76.16

[58] Field of Search ..................... 219/121.47, 121.48, 219/121.59, 76.16, 76.15, 121.5, 121.51; 427/34; 313/231.21, 231.31, 231.41

[56] References Cited

U.S. PATENT DOCUMENTS

| | | | |
|---|---|---|---|
| 2,922,869 | 1/1960 | Giannini et al. | 215/75 |
| 4,146,654 | 3/1979 | Guyonnet | 219/121.47 |
| 4,370,538 | 1/1983 | Browning | 219/121.47 |
| 4,389,559 | 6/1983 | Rotolico et al. | 219/75 |
| 4,445,021 | 4/1984 | Irons et al. | 219/121.47 |
| 4,558,201 | 12/1985 | Hatch | 219/121.48 |
| 4,672,171 | 6/1987 | Cusimano et al. | 219/76.16 |
| 4,674,683 | 6/1987 | Fabel | 219/76.16 |
| 4,777,342 | 10/1988 | Hafner | 219/75 |

*Primary Examiner*—M. H. Paschall

*Attorney, Agent, or Firm*—H. S. Ingham; E. T. Grimes

[57] ABSTRACT

The front face of the nozzle of a plasma spray device has a shallow annular recession therein. The recession is bounded inwardly by an extended portion of the nozzle, outwardly by a ring member and rearwardly by an inner surface. The ring member has therein a plurality of arcuately equally spaced holes directed radially inward toward the inner face, the holes communicating with a source of air. Powder is injected radially into the plasma stream external to the nozzle member proximate the outlet end. The air flow from the holes and entrainment of surrounding atmosphere by the plasma stream drive a toroidal vortex anchored in the recession, the vortex effecting a wiping flow on the nozzle face such as to inhibit powder from depositing on the nozzle face.

12 Claims, 2 Drawing Sheets

PLASMA SPRAY DEVICE WITH EXTERNAL POWDER FEED

This invention relates to plasma spray devices and particularly to a plasma spray gun having external powder feed.

BACKGROUND OF THE INVENTION

Thermal spraying, also known as flame spraying, involves the heat softening of a heat fusible material such as metal or ceramic, and propelling the softened material in particulate form against a surface which is to be coated. The heated particles strike the surface where they are quenched and bonded thereto. A conventional thermal spray gun is used for the purpose of both heating and propelling the particles. In one type of thermal spray gun, the heat fusible material is supplied to the gun in powder form. Such powders are typically comprised of small particles, e.g., between 100 mesh U. S. Standard screen size (149 microns) and about 2 microns.

A plasma spray gun such as disclosed in U.S. Pat. No. 4,674,683 utilizes an arc generated plasma flame to produce the heat for melting of the powder particles. The primary plasma gas is generally nitrogen or argon, and hydrogen or helium is usually added to the primary gas. The carrier gas for transporting powder is generally the same as the primary plasma gas, although other gases may be used in certain situations. A plasma spray gun basically comprises a rod-shaped cathode and a tubular nozzle-anode connected to sources of power and plasma-forming gas. The high temperature plasma stream flows axially from the nozzle. Various configurations have been disclosed for auxiliary annular gas flows around the plasma stream for such purposes as shrouding and cooling; typical arrangements are shown in U.S. Pat. Nos. 2,922,869, 4,389,559, 4,558,201 and 4,777,342.

Powder injection into a plasma gun for spraying a coating must be effected from the side of the plasma stream because of the preemptive presence of the centrally located cathode. There is a tendency for a small amount of the powder to adhere to nozzle surfaces, resulting in buildup which can interfere with the spraying and coating. For example buildup on one side can cause the spray stream to skew, or a piece of the buildup may break off and deposit as a defect in the coating.

Buildup is reduced significantly by feeding the powder into the stream externally with a lateral powder injector as shown in the above mentioned U.S. Pat. No. 4,674,683. However, even this type of feed sometimes results in detrimental buildup on the nozzle face near the injector. Moving the injector away from the nozzle helps, but at a sacrifice of heating efficiency to the powder.

SUMMARY OF THE INVENTION

Therefore, an object of the present invention is to provide a plasma spray device with reduced tendency for powder buildup on the nozzle surfaces. Another object is to provide such a device having improved heating efficiency without significant powder buildup.

The foregoing and other objects are achieved by a plasma spray device comprising a cylindrical nozzle member having an axial bore therethrough with an inlet end and an outlet end, the inlet end being cooperative with a cathode member to generate an arc plasma stream which then issues from the outlet end. The face of the nozzle member at the outlet end has a coaxial annular recession therein proximate to the bore, the recession being bounded inwardly by an extended portion of the nozzle member.

The recession has a depth about equal to or less than the radial thickness of the recession. A powder injection means is positioned for injecting powder radially into the plasma stream external to the nozzle member proximate the outlet end. During operation of the gun, entrainment of surrounding atmosphere by the plasma stream drives a toroidal vortex anchored in the recession, the vortex effecting a wiping flow on the nozzle face such as to inhibit powder from depositing on the nozzle face.

In a preferred embodiment the recession is bounded in part by an inner surface substantially perpendicular to the bore, and the device further comprises annular gas means for injecting an arcuately distributed gas flow along the inner surface so as to further drive the vortex and effect the wiping flow. The annular gas means may comprise a ring portion of the nozzle member bounding the recession radially outwardly, the ring portion having a plurality of arcuately equally spaced orifices directed radially inwardly to direct a gas flow grazingly on the inner face, the orifices being uniformly receptive of pressurized gas. In a further embodiment alternate orifices are slanted with an axial component so as to impinge the distributed gas at a slant onto the inner face.

DETAILED DESCRIPTION OF THE INVENTION

Figure 1:
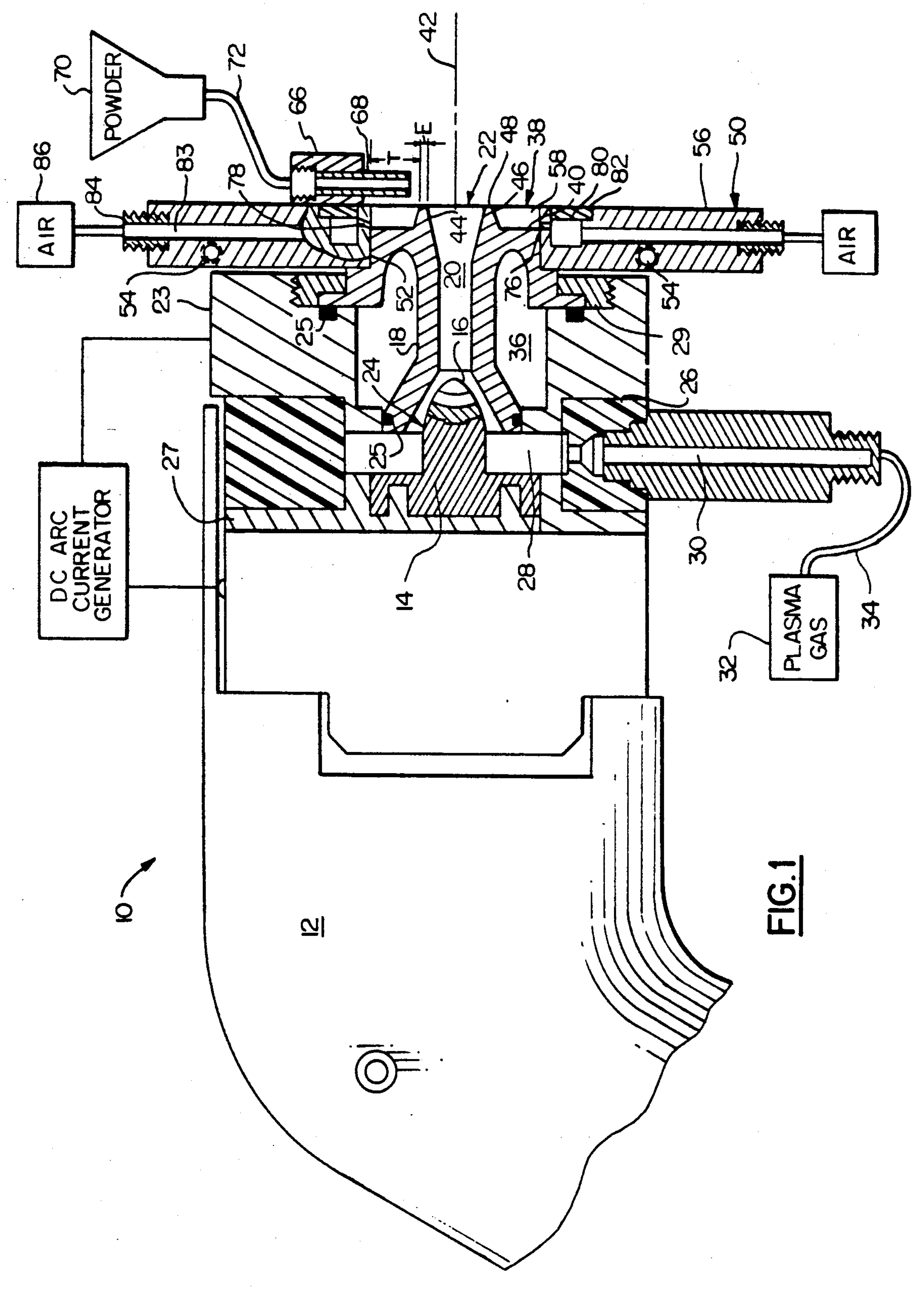
FIG. 1 is a side view, partially in section, of a plasma spray device embodying the present invention.

Referring to FIG. 1, there is shown, partially in section, a plasma spray device or gun 10 for carrying out the present invention. The gun structure may include a machine mount (not shown) or a handle portion 12 which is partially shown. Within the interior of the gun is a cathode member 14 which is generally rod-shaped with a conical tip 16 at one end (the forward end in the direction of flow), and a hollow cylindrical anode nozzle member 18 containing an axial bore 20 therethrough of varying conventional configuration and cross-sectional dimension coaxial with the cathode member.

The nozzle bore 20 has respective outwardly tapered end portions, and a cylindrical medial portion. The end from which the plasma stream issues will hereinafter be referred to as the outlet end 22 of the bore and the other end as the inlet end 24. The nozzle 18 (typically of copper) is fitted into a forward gun body 23 of electrically conducting metal such as brass, 0-rings 25 as required for sealing, and the nozzle is held in with a retainer ring 29.

The cathode 14 is similarly retained in an electrically conducting rear gun body 27. The two bodies sandwich an insulating member 26, and this assembly is held together with insulated screws (not shown). The insulator coaxially surrounds the medial portion of cathode 14, serves to insulate the cathode 14 from the anode 18, and forms an annular gap as an interior plenum 28 for passing a plasma forming gas to the inlet end of nozzle member. A conventional distribution ring (not shown) may be disposed in the plenum. Gas is supplied to the plenum chamber through an inlet 30 from a source 32 of at least one plasma-forming gas via a gas hose 34. Conventional water cooling is provided including a coolant chamber 36 in the nozzle member.

At the outlet end 22, the nozzle face 38 includes an inner surface 40 substantially perpendicular to the bore 20, i.e. to the bore axis 42, and an extended portion 44 with a slightly tapered frustro-conical surface 46 extending converging forwardly from the inner surface 40 toward the outlet end 22 proximate the bore 20, e.g. at an angle of 3.75° with the axis. The end surface 48 of the extended portion 44 should be have a relatively thin ring dimension E compared to the diameter of the outlet end of the bore; for example dimension E is 1.3 mm vs a bore outlet diameter of 7.9 mm.

A ring member 50 is affixed concentrically to the nozzle 18. This ring may actually be formed integrally with the nozzle member, or may be fabricated separately and silver soldered at the nozzle-ring interface 52, or, as in the present example, may be formed in two parts as a "clam shell" with a pair of screws 54 to clamp the ring to the nozzle. In the latter case the ring member is removable when not needed. The ring has a front surface 56 generally aligned with the end surface 48 of the extended nozzle portion 44.

Figure 2:
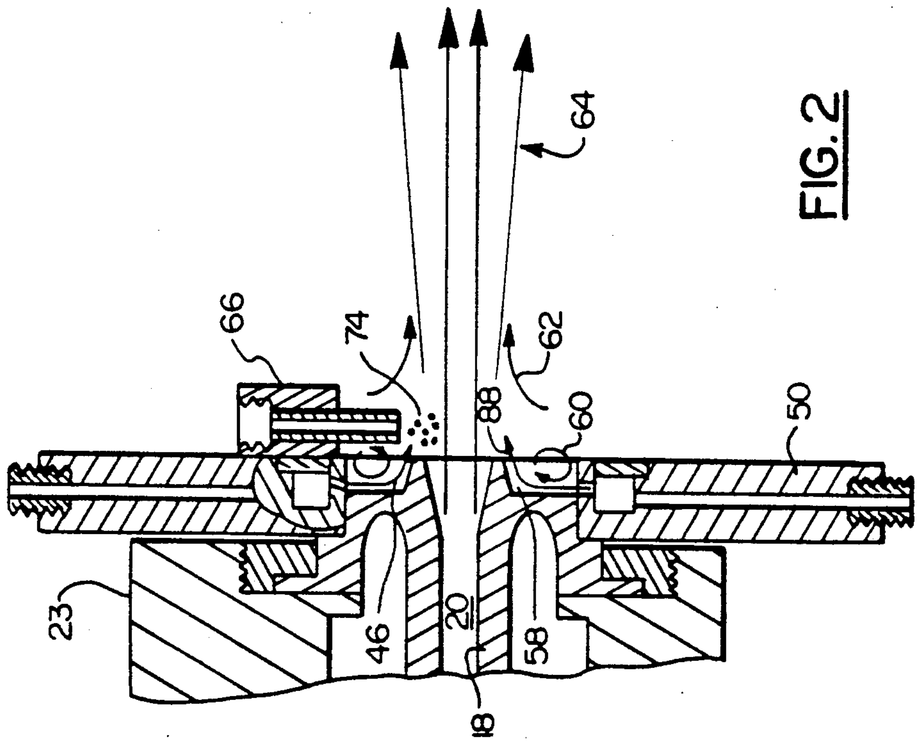
FIG. 2 is a side view in section of a portion of the device of FIG. 1 showing relevant flows.

The ring member 50, the inner surface 40 and the conical surface 46 define an annular recession 58 in the nozzle face 38. With reference to FIG. 2 the purpose of this recession is to provide an annular space for a toroidal vortex 60 to be anchored therein. This vortex is driven at least in part by the flow of atmospheric air 62 in the vicinity resulting from entrainment of air by the turbulent, high velocity plasma stream 64 issuing from the nozzle 18. Thus the plasma draws air away from the extended portion of the nozzle, inducing a toroidal circulation and the vortex.

To encourage this effect the recession 58 should be relatively shallow and free of substantial irregularities such as large grooves therein to interfere with toroidal gas circulation in the recession. Generally the recession should have a depth about equal to or less than the radial thickness T of the recession (FIG. 1). The minimum depth must be sufficient for the recession to still support and anchor the vortex. A suitable depth is about half of the radial thickness. Also, to further enhance the flows, the recession may be rounded instead of being bounded by the surfaces described above with intersecting corners.

Attached (with screws or solder) to the forward surface of the ring is a forwardly extending holder 66 for a powder injection tube 68 which is oriented approximately perpendicular to the axis 42. The tube is receptive of powder in a carrier gas from a powder feeder 70 via a powder feed line 72, so that any conventional or desired plasma spray powder may be injected (at 74 in FIG. 2) into the plasma stream 64 issuing from the outlet end. With such powder feeding, spraying with the plasma gun is effected in the ordinary manner.

With the above-described recession 58 in the nozzle face it was found that the buildup on the nozzle face is substantially reduced or eliminated. This is attributed to the vortex 60 anchored in the recession, with its toroidal flow of atmospheric air over the nozzle surfaces having a wiping effect so as to inhibit powder from depositing on the nozzle face.

However, there still may be some tendency for a film of powder to deposit on the nozzle. To reduce this further, an annular gas means is added to further provide the gas wiping. Thus, according to a preferred embodiment the ring member 50 has a plurality of arcuately, equally spaced orifices 76,78 directed radially inwardly toward the inner face. These orifices connect outwardly to an annular plenum chamber 80 conveniently cut as a groove in the ring face and enclosed with a soldered-in washer-shaped ring 82. A pair of gas channels 83 and gas fittings 84 communicate with a source of pressurized gas 86 via air hoses 87.

Air generally is suitable unless inert atmosphere is desired. The compressed air is directed uniformly through the orifices 76,78 in such a manner as to further drive and strengthen the vortex 60, thereby effecting an enhanced wiping flow on the surfaces of the nozzle member. Even in an absence of a vortex the air provides a beneficial wiping effect.

There should be at least eight such orifices, advantageously sixteen, e.g. 1.6 mm diameter. For additional enhancement it is desirable to divide the orifices into sets of alternating perpendicular orifices 76 and slanted orifices 78. The perpendicular orifices 76 are substantially perpendicular to the bore 20 and are positioned so as to graze the compressed air over the inner face 40. The slanted orifices 78 are slanted rearwardly from the plenum 80 with an axial component so as to impinge the compressed air onto the inner face. A slant angle of 5° to perpendicular is suitable. The pressure and flow rate of air are set somewhat low so as not to interfere with the spray stream and its powder entrainment, but sufficient to enhance the wiping effect; for example 1.4 kg/cm$^2$ (20 psi) and 3 l/min flow for the sixteen holes.

Although any reasonable arrangement for the annular gas means that enhances the vortex should be satisfactory, such an arrangement should avoid interfering with the plasma spray stream. Thus orienting the orifices radially to the inner surface, as described above, may be preferable to alternate arrangements that more directly aim the air rearwardly along the frustro-conical surface of the extended portion of the nozzle. Such direct rearward aiming of the air may interfere with powder entrainment or the spray stream. Radially injected air 88 (FIG. 2) along the inner surface 40 will be diverted sufficiently to flow rearwardly along the nozzle portion surface 46 and enhance the vortex without interfering significantly with the spray.

In an example incorporating the above described invention, a Metco type 3MB-II gun sold by The Perkin-Elmer Corporation, with a GH type nozzle, a #4 powder port, was used to spray yttria stabilized zirconia powder having a size of $-110+10$ microns. Parameters were: argon primary gas at 7.0 kg/cm$^2$, 32 l/min, hydrogen secondary gas at 5.3 kg/cm, 11 l/min, argon carrier gas at 7.0 kg/cm$^2$, 7.1 l/min, 600 amperes, 60 to 70 volts and 2 kg/hr spray rate. After 2 hours there was essentially no buildup compared with a standard 3MB-II gun which produced significant buildup after 2 hours.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A plasma spray device comprising:

a cylindrical anode nozzle member having an axial bore therethrough with an inlet end and an outlet end, the inlet end being cooperative with a cathode member to generate an arc plasma stream to issue from the outlet end, the nozzle member further having a nozzle face at the outlet end with a coaxial annular recess therein proximate to the bore, the recess being bounded radially inwardly by an extended portion of the nozzle member, the recess having a radial thickness and a depth about equal to or less than the radial thickness; and powder injection means for injecting powder radially into the plasma stream external to the nozzle member proximate the outlet end;

such that entrainment of surrounding atmosphere by the plasma stream drives a toroidal vortex anchored in the recess, the vortex effecting a wiping flow on the nozzle face so as to inhibit powder from depositing on the nozzle face.

2. The device according to claim 1 wherein the depth is about half of the radial thickness.

3. The device according to claim 1 wherein the device further comprises annular gas means for flowing an arcuately distributed gas flow along the extended portion so as to further drive the vortex and effect the wiping flow.

4. The device according to claim 3 wherein the recess is bounded in part by an inner surface substantially perpendicular to the bore and intersecting the extended portion, and the annular gas means is disposed to inject the arcuately distributed gas flow radially inwardly along the inner surface.

5. The device according to claim 4 wherein the annular gas means comprises a ring portion of the nozzle member bounding the recess radially outwardly, the ring portion having a plurality of arcuately equally spaced orifices directed radially inwardly toward the inner face, the orifices being uniformly receptive of pressurized gas.

6. The device according to claim 5 wherein the orifices are divided into sets of alternating perpendicular orifices and slanted orifices, the perpendicular orifices being oriented substantially perpendicular to the bore and positioned so as to graze the distributed gas on the inner face, and the slanted orifices are slanted with an axial component so as to impinge the distributed gas at a slant onto the inner face.

7. The device according to claim 1 wherein the recess is bounded radially inwardly by a frusto-conical surface of the extended portion converging toward the outlet end.

8. A plasma spray device comprising:

a cylindrical anode nozzle member having an axial bore therethrough with an inlet end and an outlet end, the inlet end being cooperative with a cathode member to generate an arc plasma stream issuing from the outlet end, the nozzle member further having at the outlet end a nozzle face, the nozzle face including an inner surface substantially perpendicular to the bore and an extended portion of the nozzle member extending from the inner surface toward the outlet end proximate the bore;

a ring member affixed to the nozzle member so that the ring member, the inner surface and the extended portion define an annular recess at the nozzle face, the recess having a radial thickness and a depth about equal to or less than the radial thickness, the ring member having a plurality of arcuately spaced orifices uniformly receptive of pressurized gas, the orifices being directed radially inwardly so as to impinge the pressurized gas onto the inner face; and powder injection means for injecting powder radially into the plasma stream external to the nozzle member proximate the outlet end;

such that a toroidal vortex anchored in the recess enhanced by the pressurized gas effects a wiping flow on the nozzle face so as to inhibit powder from depositing on the nozzle face.

9. The device according to claim 8 wherein the depth is about half of the radial thickness.

10. The device according to claim 8 wherein the plurality of orifices is at least 8 in number.

11. The device according to claim 8 wherein the recess is bounded radially inwardly by a frusto-conical surface of the extended portion converging toward the outlet end.

12. The device according to claim 8 wherein the orifices are divided into sets of alternating perpendicular orifices and slanted orifices, the perpendicular orifices being oriented substantially perpendicular to the bore and positioned so as to graze the distributed gas on the inner face, and the slanted orifices are slanted with an axial component so as to impinge the distributed gas at a slant onto the inner face.

* * * * *